United States Patent [19]
Avins

[11] 4,408,293
[45] Oct. 4, 1983

[54] AUTOMOTIVE CONTROL SYSTEMS FOR IMPROVING FUEL CONSUMPTION

[76] Inventor: Jack Avins, 178 Herrontown Rd., Princeton, N.J. 08540

[21] Appl. No.: 212,852

[22] Filed: Dec. 4, 1980

[51] Int. Cl.³ .................. G05D 13/64; B60K 31/00
[52] U.S. Cl. .................................. 364/426; 180/179; 364/424.1
[58] Field of Search ............... 364/426; 180/176, 179; 192/0.055; 123/352

[56] References Cited

U.S. PATENT DOCUMENTS

| Re. 27,324 | 3/1972 | Granger et al. | 180/176 |
|---|---|---|---|
| 3,332,406 | 7/1967 | Perry et al. | 180/282 |
| 3,455,411 | 7/1969 | Carp et al. | 180/176 |
| 3,485,316 | 12/1969 | Slavin et al. | 180/176 |
| 3,570,622 | 3/1971 | Wisner | 180/176 |
| 3,599,052 | 8/1971 | Carp et al. | 180/176 |
| 3,648,798 | 3/1972 | Jania | 180/176 |
| 3,648,808 | 3/1972 | Kato | 180/176 X |
| 3,727,517 | 4/1973 | Slavin et al. | 91/361 |
| 3,794,389 | 2/1974 | Davis et al. | 303/106 |
| 3,868,933 | 3/1975 | Bigalke et al. | 180/179 X |
| 3,952,829 | 4/1976 | Gray | 364/426 X |
| 3,966,011 | 6/1976 | Minami et al. | 180/176 |
| 3,978,837 | 9/1976 | Lundberg | 123/357 |
| 3,983,954 | 10/1976 | Noddings et al. | 180/179 |
| 4,010,674 | 3/1977 | Noddings et al. | 91/47 |
| 4,039,061 | 8/1977 | Pruvot et al. | 364/426 X |
| 4,072,206 | 2/1978 | Larson et al. | 180/176 |
| 4,084,659 | 4/1978 | Abend et al. | 364/426 X |
| 4,084,672 | 4/1978 | Avins | 192/55 |
| 4,286,685 | 9/1981 | Rudolph et al. | 180/176 |

FOREIGN PATENT DOCUMENTS 2436982 12/1976 Fed. Rep. of Germany.
2254721 of 0000 France.

*Primary Examiner*—Felix D. Gruber
*Attorney, Agent, or Firm*—Arthur L. Plevy

[57] ABSTRACT

An automobile control system is disclosed which saves fuel while reducing environmental pollution. The accelerator pedal of a vehicle is monitored to provide a control signal indicative of the magnitude of the depression of the pedal. A first sensor monitors engine speed, while a second sensor monitors vehicle speed. A comparator aided by mode selected logic automatically selectively compares either the engine speed signal or the vehicle speed signal with the control signal and the throttle is automatically advanced or retarded for a given accelerator pedal position to provide operation with low fuel consumption and improved transmission shifting. In a mode which is particularly economical of fuel consumption for highway driving, the average vehicle speed is controlled by the accelerator pedal and automatically is caused to vary slightly in a cyclical manner so that intervals of acceleration are followed by intervals of coasting in which the throttle is substantially closed. The coasting intervals automatically increase when the drag is low and decrease when the drag is high. The system further simplifies changing from coasting or free wheeling to direct drive by automatically adjusting the engine shaft speed to coincide with the drive shaft speed when engine braking is required.

1 Claim, 2 Drawing Figures

AUTOMOTIVE CONTROL SYSTEMS FOR IMPROVING FUEL CONSUMPTION

BACKGROUND OF THE INVENTION

This invention relates to control systems for gas powered vehicles, and more particularly to a control system for improving fuel consumption in a conventional automobile or similar vehicle.

The present crisis regarding the cost and supply of gasoline for automotive use has resulted in a widespread effort to decrease fuel consumption. Along with this major problem is the further need to reduce noxious emissions to a low level and to control pollution.

Although much progress has been made, the problems still persist and efforts to find solutions continue. This disclosure contributes to the solution of some of these problems by changing the driver-engine-transmission interface to prevent the waste of fuel that occurs with state-of-the-art practice. While most readily applicable to the design of new vehicles, the system disclosed can be retrofitted to many of the approximately fifty million fuel-inefficient vehicles with large engines to significantly reduce both their fuel consumption and their exhaust emissions during the years they will continue in use.

For example, it is apparent that considerable energy is wasted in automobiles which employ direct accelerator pedal control of the throttle. In such vehicles, the engine rotates at relatively high speeds when engine torque is not required to propel the vehicle. In most instances when a driver desires to slow down due to road conditions or otherwise, he normally does not fully release the accelerator pedal and merely reduces the displacement of the pedal slightly to control the speed. This driving practice consumes substantially more fuel than would a complete release of the pedal attendant with a full throttle closure.

To circumvent the above problem, the control system to be described includes a pedal control which operates to control the speed of the vehicle, rather than the speed of the engine. If the pedal controls the vehicle speed directly, driver control is not necessary when more or less engine torque is required. If the driver wishes to slow down, only a slight change in the pedal position is required to result in the throttle being fully closed. If, for example, the car is going down hill and engine torque is not required to maintain the speed, the driver does not have to move his foot as the throttle will close and stay closed until the bottom of the hill or whenever torque is again required to maintain the speed constant. With this system of accelerator pedal control, the throttle is substantially closed when engine torque is not required without driver action, thus resulting in a substantial improvement in fuel economy.

The control system includes an accelerator pedal design in which the pedal is automatically caused to selectively control either vehicle speed or the engine speed. The engine speed mode is used in a transient way to supplement the vehicle speed mode in order to improve the shifting of transmission gears and the engagement of direct drive when engine braking is required. In addition, the engine speed mode is useful when the car is stationary, in neutral, or in reverse, although substantially reducing the gain of the servo control in the vehicle speed mode provides an alternative design.

The control system further improves fuel efficiency by utilizing the engine closer to its maximum power capacity (and therefore substantially more efficiently) for a greater percentage of the driving time, particularly at cruising speeds. This is accomplished by automatically causing the vehicle to accelerate cyclically for short controlled intervals so as to load the engine more fully to improve its fuel efficiency, while maintaining the average speed relatively constant. The periods of acceleration are followed by periods of coasting so that the fuel consumption during these coasting intervals is very low. The intervals between pulses of acceleration automatically are caused to increase when the drag or resistance to coasting is low, and automatically to decrease when the drag is high. When the coasting intervals are very small, as in hill climbing, the pulsing is automatically deactivated.

The control system may further employ coasting or free wheeling operation for further achieving fuel economy. Free wheeling, direct drive, and clutch controlled direct drive mechanisms suffer from the problem that there is frequently an objectionable shock transient when these devices are engaged. The control system to be described includes means for automatically momentarily bringing the engine shaft to the proper speed just prior to engagement with the drive shaft to thus compensate for the above problem.

It is therefore a primary object of the present invention to provide an improved automobile control system capable of achieving significant reductions in fuel consumption.

BRIEF DESCRIPTION OF THE PREFERRED EMBODIMENT

In a motor vehicle of the type employing an internal combustion engine coupled to a transmission system for driving the wheels of said vehicle to achieve a vehicle speed according to the displacement of an accelerator pedal for controlling the engine speed via a throttle, with the vehicle achieving a vehicle speed based on said engine speed and said transmission state, said vehicle including a braking system for slowing the vehicle, the combination therewith of an automotive control system for improving fuel efficiency, comprising engine speed sensor means for providing an output indicative of engine speed, vehicle speed sensor means for providing an output indicative of vehicle speed, means coupled to said accelerator pedal for providing an output control signal indicative of the magnitude of pedal actuation, comparison means operative in a first mode to compare said control signal with said engine speed and operative in a second mode to compare said control signal with said vehicle speed for providing a comparison output signal indicative of any difference between said engine or vehicle speed as compared to said control voltage, and control means coupled to said engine and responsive to said comparison output signal to control the speed of said engine in said first mode and to control the speed of said vehicle in a second mode.

DETAILED DESCRIPTION OF THE INVENTION

Before proceeding with a description of the automotive control system according to this invention, it is believed that a brief description of the rationale and operating conditions is necessary.

It is well known that the fuel efficiency of automobiles degenerates progressively when the engine is operated below its maximum power output capability. To reduce this degradation of fuel efficiency, automobile designers have gone increasingly to smaller engines and lower axle ratios, including the use of overdrive. While such techniques reduce consumption, the fuel efficiency can further be improved by employing the control system to be described.

Figure 1:
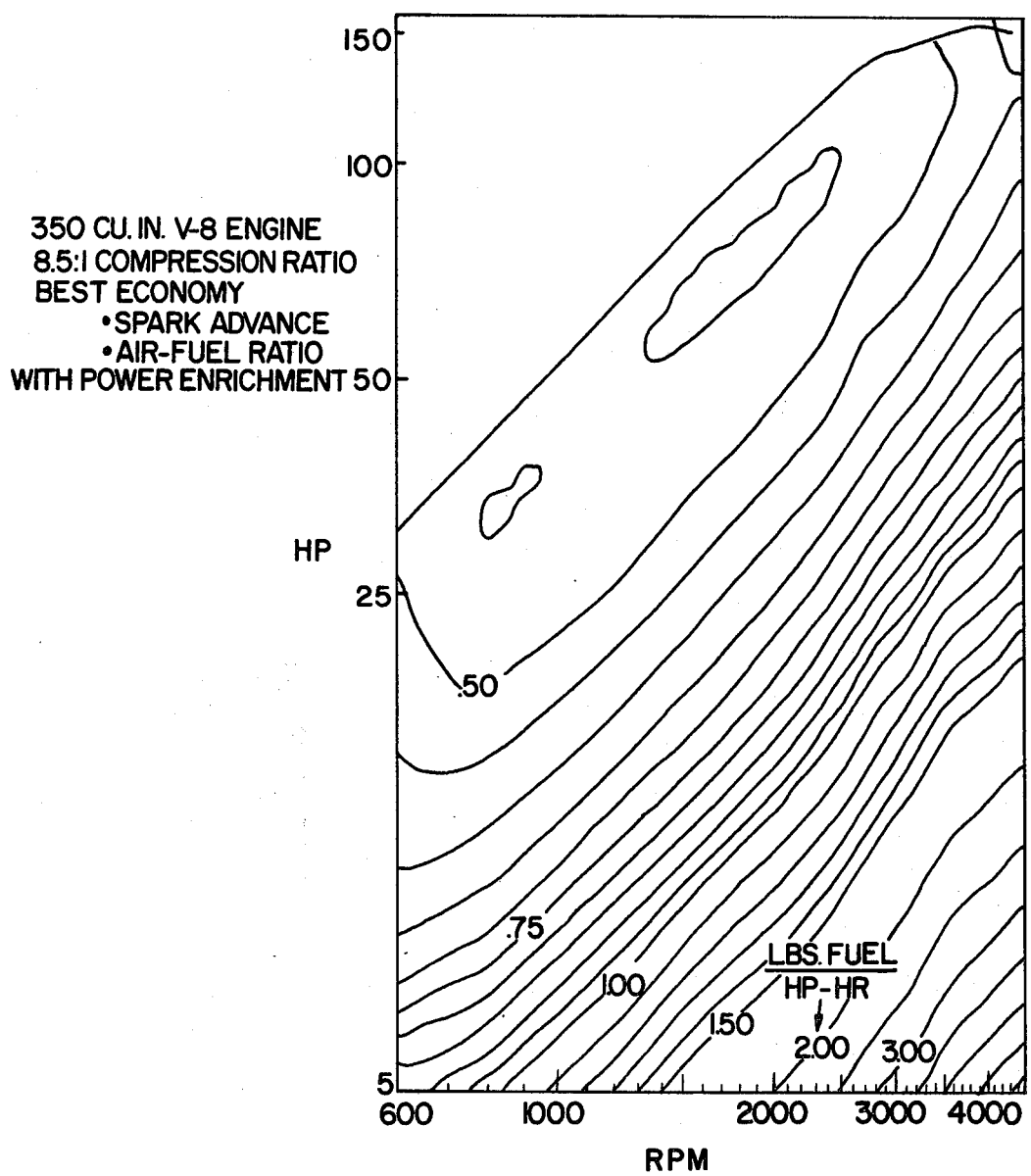
FIG. 1 is a graph for a typical 350 cubic inch V-8 engine which depicts the pounds of fuel consumed per horsepower as a function of the brake horsepower and the engine revolution per minute (RPM)

The engine characteristics in FIG. 1 show the fuel efficiency of a representative 350 cubic inch engine as a function of the engine speed (rpm) and the brake horsepower it produces. The relatively poor efficiency when the engine is operated below its maximum power output capability is apparent.

From FIG. 1, the following data is tabulated:

| HORSEPOWER | SPEED-RPM | FUEL EFFICIENCY |
|---|---|---|
| 5 HP | 600 RPM | 0.87 lb fuel/HP × hr. |
| 5 | 2000 | 2.0 |
| 5 | 3000 | 3+ |
| 15 | 2000 | 0.86 |
| 30 | 2000 | 0.58 |
| 45 | 2000 | 0.50 |

The fuel efficiency when the engine is idling is poor and is considerably worse when the engine is turning over at a speed corresponding to the vehicle speed but is not producing a significant engine torque, as is indicated in the table above.

When the auto slows down slightly, from an initial speed $V_1$ to $V_2$, the corresponding energy loss is given by:

$$\text{Energy loss} = \tfrac{1}{2}m(V_1^2 - V_2^2) = mV_{av}\cdot(V_1 - V_2)$$

where: $V_{av} = (V_1 + V_2)/2$

For a 4000 lb. auto which is observed to slow down at the rate of 1 mph in 1.6 seconds, the energy loss is 13,400 ft. lbs. The rate of energy loss is approximately 15 horsepower.

If the throttle is pulsed during the pulsing intervals at 30 HP, the auto will accelerate at a rate equal to its deceleration when the engine torque is removed. If the throttle is pulsed for t seconds, the car will gain in speed by the same amount that it will lose speed when the pulsing is removed. The duty cycle will therefore be 50% and the average speed will be maintained constant.

When the engine is not being pulsed, it is operating to produce 15 HP at 2000 rpm at 50 mph. Its fuel consumption then is about 12.9 lb. fuel/hr.

When the engine is pulsed with a 50% duty cycle, 30 HP is required to maintain constant average speed. If the fuel consumption rate during the coasting intervals is ¼th the fuel consumption rate at a steady 50 mph, the fuel consumption rate for a 50% duty cycle is calculated to be approximately 10.3 lb./hour. The fuel saving as a result of pulsing and thereby operating the engine at higher fuel efficiency while producing the required torque results in a 25% improvement in miles per gallon.

If the engine displacement were reduced to zero during the coasting intervals, pulsing would improve the efficiency by a 48% improvement in miles per gallon.

If the pulsing duty cycle is reduced to 0.33 rather than 0.5 as above, the reduction in fuel consumption is substantially greater. If the idling consumption is again ¼th the steady state 50 mph consumption, the fuel consumption as calculated is about 9.6 lb./hr. since the power requirement is 45 HP during the acceleration intervals. This results in a 34% improvement in miles per gallon.

If the engine displacement were reduced to zero during the coasting intervals, pulsing would improve the efficiency by a 74% improvement in miles per gallon.

Reducing the engine displacement, rather than shutting off the engine, has the advantage that the engine can continue to rotate at substantially constant speed during the coasting intervals and that direct drive can be used without engine drag. To restart the engine requires only the resupply of fuel and ignition, if the latter has been turned off.

The pulsing system disclosed here is particularly advantageous as a means for reducing fuel consumption in the some fifty million cars now on the road which were designed for maximum performance rather than for fuel economy. Such automobiles use relatively large engines and high axle ratios so that the engine is relatively grossly inefficient at the low levels of torque delivered at normal cruising speeds. The control system described in this invention can easily be installed in many of these cars if the industry were to make kits available to the consumer. The kits could also include an idling servo, the design of which is facilitated by the fact that the accelerator pedal control system already has some of the hardware needed for the idling servo. This would further substantially reduce fuel consumption.

There is considerable reason for making the installation of such kits mandatory in fuel inefficient cars because the public interest and the individual car owner's interest demand that fuel consumption be reduced and environmental pollution be prevented whenever possible.

It is further noted that automobiles with manual transmissions would have substantially better mileage if engine drag did not prevent coasting. There are, of course, numerous occasions when conditions permit the safe coasting of the automobile. Typically, the engine drag at 40 mph is about three times as great as the drag due to friction and air resistance.

The adverse effects of engine drag on the fuel economy are substantially reduced by using this control system to control a clutch which disconnects the engine from the rear wheels so as to permit coasting without engine drag. When coasting is desired, the accelerator pedal is released and the resulting difference between the actual vehicle speed and the vehicle speed which corresponds to the reduced pedal displacement is detected by the comparator and is caused to disengage the clutch via an actuator to enable the automobile to coast. When the driver wishes to again accelerate, the driver depresses the accelerator pedal and the clutch engages automatically when the engine speed reaches a level where it corresponds to the actual vehicle speed to implement a smooth engagement of the clutch.

The control system disclosed here is advantageous in improving the ease of shifting in both manual and automatic transmissions. The vehicle speed mode is supplemented by transient use of the engine speed mode while shifting gears, a divider being used in the output of said engine speed sensor to divide the sensor output by the gear ratio so as to cause the engine speed to assume the proper value for each gear ratio as the transmission is shifted. In this way, the need for driver skill in manipulating the accelerator pedal and clutch is obviated.

To engage direct drive for braking, the actuation of the brake pedal is caused to momentarily speed up the engine to ease clutch engagement. The auto will stay in direct drive until the accelerator pedal is depressed by the driver.

Figure 2:
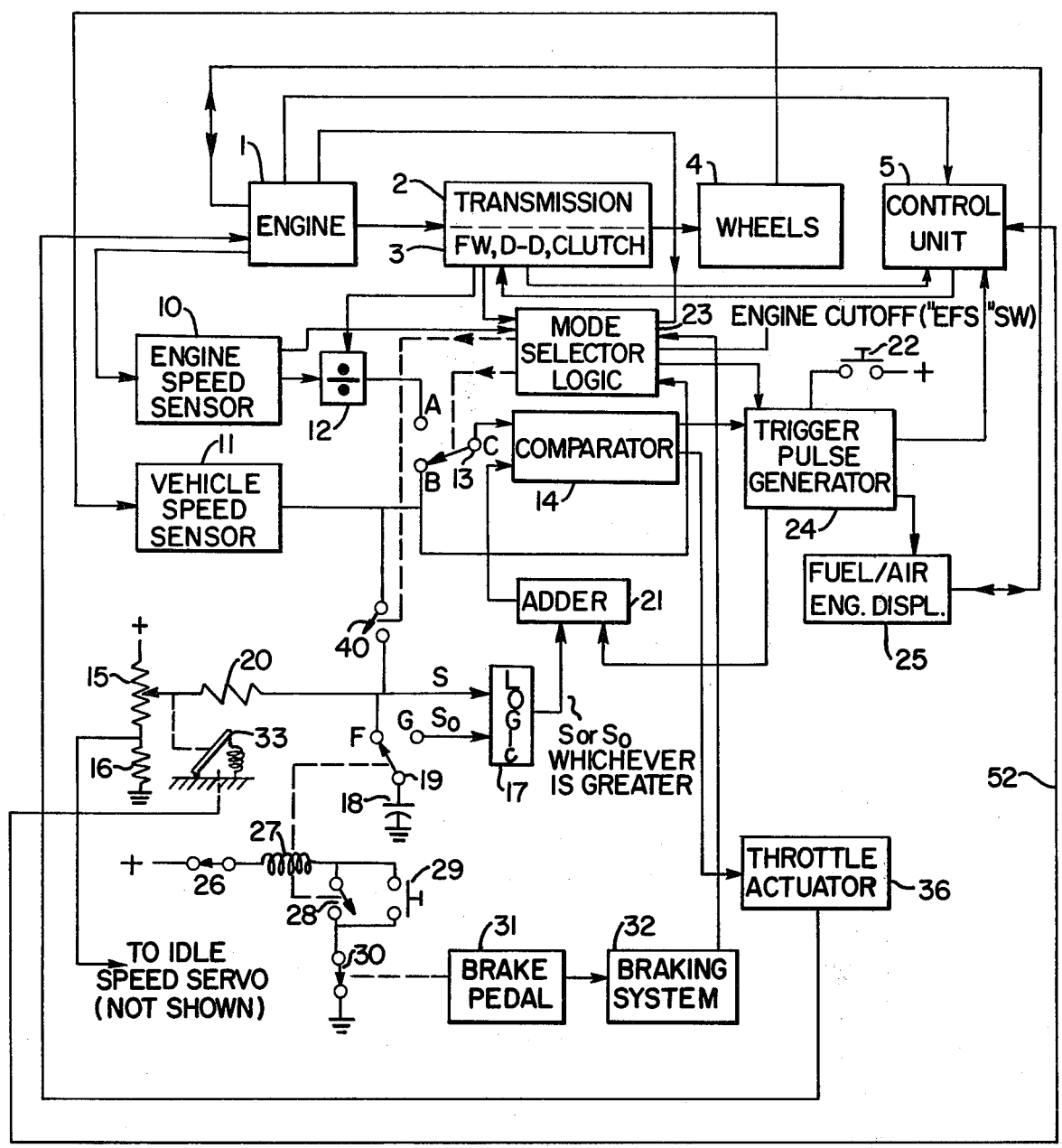
FIG. 2 is a detailed block diagram of an automotive control system according to this invention.

Referring to FIG. 2, there is shown a detailed block diagram of an automotive control system according to this invention.

An engine 1 conventionally associated with an auto is normally coupled to a transmission assembly 2 to control drive of the wheels 4 as is conventional and well known. A further module 3 is designated as FW,D-D and clutch and is the drive coasting mechanism employed in this invention. The term FW stands for free wheeling, which technique is completely described in U.S. Pat. No. 4,084,672 entitled AUTOMATIC CONTROL OF FREE WHEELING issued on Apr. 18, 1978 to J. Avins, the Inventor herein.

Essentially, free wheeling is a term applied to an auto transmission constructed so that the engine drives the wheels, but the wheels cannot drive the engine. The term DD designates direct drive, and the term clutch designates drive via the clutch mechanism. Examples of such transmission assemblies to provide such operations are well known in the art as indicated in the above patent and many of the prior art references included and cited therein.

There is shown an engine speed sensor 10 having an input coupled to the engine and operative to provide an output signal or voltage proportional to the engine speed. The engine speed sensor 10 may be a conventional tachometer which measures the rotational speed of the engine crank shaft and converts this information to a voltage which exhibits an increasing level for increasing speed. Techniques for sensing engine speed are well known. For example, the ignition circuit of a vehicle supplies a pulse train of variable frequency proportional to speed and these pulses can be converted to corresponding voltage levels by known techniques.

The output of the engine sensor 10 is directed to one input of a divider 12. The other input of divider 12 is coupled to the transmission assembly 2 and 3 to enable the divider to provide an output signal according to engine speed, which signal is selectively divided by a factor determined by the transmission gear ratio. The divider 12 aids in maintaining engine speed at the proper value for each gear ratio without the need for "backing off" on the accelerator pedal when shifting to a higher gear.

The output of divider 12 is coupled to a first terminal A of a switch 13. The arm C of switch 13 is coupled to a first input of a comparator circuit 14. A vehicle speed sensor 11 is depicted. The vehicle speed sensor 11 has an input obtained from means associated with the vehicle wheels to derive at an output a voltage or signal which is proportional to the vehicle speed. The sensor 11 may be an alternator driven from the drive or axle shaft which will provide a signal increasing in frequency as the vehicle speed increases. This frequency is converted to a corresponding voltage at the output of sensor 11.

The output of sensor 11 is coupled to terminal B of switch 13 and hence, comparator 14 can receive at its input a signal corresponding to engine speed or vehicle speed. The engine speed sensor 10 and the vehicle speed sensor 11 operate to provide equal output voltages for corresponding speeds in direct drive. As indicated, the divider 12 supplies the comparator 14 with an input which corresponds to vehicle speed for whatever transmission gear ratio is used as the divider factor is changed according to the gear ratio. As will be explained, the operation of switch 13 is controlled by a mode selector logic circuit 23.

Shown in FIG. 2 is a spring loaded accelerator pedal 33 as found in conventional autos. The accelerator pedal 33 is mechanically or otherwise coupled to a voltage divider comprising a potentiometer 15 in series with a resistor 16. Movement of the accelerator pedal moves the arm of the potentiometer 15, which provides an output voltage which increases with increasing displacement of the pedal 33. The fixed resistor 16 provides a reference voltage which can be employed to maintain the engine idling speed constant and employed as a reference signal to an idle speed servo system (not shown) according to prior art teaching.

The arm of potentiometer 15 is directed via resistor 20 to a first input (5) of a logic circuit 17. Essentially, the logic circuit transfers this voltage indicative of the position of the acclerator pedal 33 to one input of an adder 21. The output of adder 21 is directed to the second input of comparator 14. A first output of the comparator 14 is directed to the input of a throttle actuator 36 whose output is coupled to the throttle in engine 1 for adjusting the same so as to maintain either the engine speed or the vehicle speed constant. Thus, comparator 14 receives one input (S) from the accelerator pedal circuit and can compare this input with either the engine speed via divider 12 or the vehicle speed via sensor 11 according to the position of switch 13 as controlled by the mode selector 23.

The comparator 14 as will be further described may contain an amplifier to allow direct drive of the throttle actuator. Accordingly, the comparator 14 may include shaping circuitry to provide a non-linear response so that the actuator 36 will operate to fully close the throttle when the output of the comparator 14 is indicative of a minimum engine torque requirement.

The comparator characteristics are designed to prevent excessive acceleration with normal pedal displacement under all driving conditions, particularly under slippery road conditions. The servo amplifier characteristics can be modulated dynamically as a function of speed, manifold pressure, and engine displacement to obtain the most desirable acceleration rates and handling characteristics. For example, the gain can be modulated downward if the pedal is depressed too rapidly and the engine vacuum falls.

A further output from comparator 14 is directed to an input of a trigger pulse generator 24. The generator 24 has another input from the mode selector 23 and a switch 22 input for manually activating the generator 24, as will be explained.

Essentially, the trigger generator 24 provides an output trigger when the driver elects to operate the vehicle in a throttle pulsing mode for fuel efficiency. Assume that the vehicle is being driven at constant speed either under pedal control or during a cruise control mode. Upon depression of the momentary switch 22, a long pulse (several seconds in duration), is generated. This pulse is shaped into a ramp voltage signal via generator 24. Ramp generators are extremely well known in the art. The output ramp via generator 24 is of a voltage equal to the pulse length and this ramp is coupled to the second input of adder 21, where it is combined with the output of the pedal potentiometer 15 during the pulsed mode, as the adder 21 adds both input signals to obtain an output signal. The comparator 14 now compares the added output signal with speed information at the other input and hence, will provide an output signal which will linearly increase the speed of the vehicle according to the slope of the ramp via the throttle actuator 36. At the termination of the ramp, the auto will be traveling slightly faster than the controlled speed. The system, as explained, will cause the vehicle to coast until the speed is reduced to the controlled speed. At this point, the comparator 14 causes the throttle actuator 36 to advance the throttle to restrain further slowing of the vehicle.

The trigger pulse generator 24 monitors the output from the comparator 14 and when the output is indicative of a level to start throttle advancement, a trigger is generated which then provides the ramp voltage output as previously provided by switch 22. The ramp again causes the throttle to be pulsed and the auto accelerates until the end of the pulse or ramp period. At the end of this period, the throttle is fully retracted and the vehicle coasts for a length of time which varies according to friction, wind resistance and road gradient. Accordingly, during the interval when the car is accelerated, the operation is relatively efficient and during the coasting intervals very little fuel is consumed because the engine is idling at a very low rpm.

With the above considerations in mind, it is noted that the coasting interval, although variable, is readily identifiable by accessing the output of comparator 14 and generator 24. Thus, this interval can be detected and used to optimize the fuel-air mixture of the carburetor as well as cylinder displacement to further reduce fuel consumption. Thus, module 25 provides an output indicative of the coasting interval to control fuel air mixture or engine displacement.

For example, module 25 can operate to close cylinder valves and hence, to inhibit the fuel supply to certain cylinders and operate the vehicle with one or two cylinders during coasting. The technique can be employed by further implementing such operation when a coasting interval exceeds a predetermined time interval. In this mode, the engine will continue to rotate with low loss. In the direct drive mode, the engine will turn at the same speed as the drive shaft and hence, the engine would start automatically at the end of the coasting interval to deliver power as called for by comparator 14 and initiated by a signal from generator 24 to the module 25.

The control system as described thusfar also enables the provision of the cruise control in a simple and reliable manner. Shown in FIG. 2 is another input to logic circuit 17 designated as So. A relay contact 19 has its arm coupled between a first terminal F and a second terminal G. The common terminal of contact 19 is coupled to a capacitor 18. As seen from FIG. 2, capacitor 18 charges to the voltage indicative of the setting of pedal potentiometer 15 and stores this voltage. If the driver depresses pushbutton 29, relay coil 27 is activated provided switch 26 and switch 30 are closed. Contact 28 associated with coil 27 closes to latch the relay and contact 19 moves to terminal G. Hence, the logic unit now directs the voltage So as stored to adder 21 and hence, to comparator 14. The input S is still coupled to potentiometer 15, but since the pedal 33 is released by the driver, this voltage is low and logic circuit 17 passes the greater voltage S or So to the adder 21. During this mode, if the driver wishes to increase speed, he depresses the pedal 33 until S exceeds So and the vehicle operates at the higher speed. When he releases the pedal 33, the speed is determined by So. As soon as the driver applies the brake via pedal 31, switch 30 is opened, thus deactivating coil 27 and returning contacts 28 and 19 to their quiescent condition. This operation or cruise control operates with the above described pulsing mode as the other input to adder 21 is obtained via generator 24. If the driver determines that the pulsing mode is not desirable, he will depress switch 22. The depression of switch 22 will now disable pulsing. However, if pulsing is operative and the mode selector logic 23 operates switch 13 to the engine speed sensor terminal A, the pulsing is disabled. The magnitude of the ramp is adjusted in accordance with vehicle speed and not engine speed and may be further modulated as a function of the coasting interval. One can also disable pulsing automatically according to road conditions. Thus, if a steep hill is being negotiated, pulsing can be disabled by means of detecting when the coasting interval is less than a predetermined value or by the use of an inclinometer or other angle detection device.

As will now be understood, the function of the mode selector logic 23 is to determine whether the system operates in the engine speed mode via sensor 10 or in the vehicle speed mode via sensor 11. The mode selector logic 23 operates switch 13 on the basis of the vehicle input speed as derived from the engine, the location of the gear shift selector as derived from the transmission 2. A further input to the mode selector logic is designated as ENGINE CUTOFF or EFS.

This system is described in a copending patent application entitled FUEL SAVING APPARATUS FOR AUTOMOBILES, Ser. No. 164,793 filed on June 30, 1980 for the Inventor herein. In that system, the driver, via a selectively activated switch can shut off the engine of the vehicle during operation and can automatically start the engine by depression of the accelerator pedal. When such a system causes engine shut-off as in FIG. 2, the mode selection logic 23 operates to automatically switch the comparator 14 to the engine speed mode via terminal A.

The mode selection logic 23 operates so that pulsing via generator 24 cannot be activated when the system is operating in the engine speed mode or when the vehicle is being operated at low speeds. The logic for mode selection is simple to implement, while the designer has great flexibility in implementing such logic.

As alluded to above, additional fuel savings can be provided if the auto is equipped with a free wheeling, coasting or direct drive mechanism 3 as coupled with the transmission. This enables the drive of the vehicle to be switched between coasting and direct drive. If a coasting system is employed, activation of the brake pedal 31 for more than a predetermined time interval will cause the direct drive to be engaged without causing a shock or stress transient on the system.

For purposes of further explanation, assume the vehicle is coasting down hill in the free wheeling mode and the driver applies the brake 31 with a predetermined force and exerts this force for a given time interval. This signifies that engine braking assistance is required. The braking system 32 as coupled to the brake pedal 31 sends a control signal indicative of the above conditions to the mode selector logic 23. The mode selector logic 23 momentarily operates switch 40 which applies the vehicle speed sensor 11 output to logic circuit 17, while activating switch 13 to position A. This causes the engine to speed up momentarily to the proper speed level corresponding to the vehicle speed. The control unit 5 then operates to cause the direct drive mechanism 3 to engage smoothly since at this time, the drive shaft and the transmission shaft are rotating relatively at the same speed. The engine then automatically slows down to provide engine braking.

The mode selector logic 23 causes switches 13 and 40 to operate in this mode for a period long enough for the engine 1 to reach the desired speed. The engagement of direct drive is preferably delayed until a significant force is applied to the brake for a given interval to determine engine braking assistance is necessary.

When the accelerator pedal 33 is accessed again, switching means via connection 52 are provided to the control unit 5 to allow the vehicle to again coast. This is depicted in U.S. Pat. No. 4,084,732.

The control system here described lends itself to improving the shifting of both manual and automatic transmissions. When operating in the preferred vehicle speed mode, the mode selector logic 23 functions during shifting of gears to cause the switch 13 momentarily to shift from position B to A, so that the engine is automatically speeded up or slowed down to correspond to the new gear ratio as the transmission is shifted. When the shift is completed, switch 13 returns to the vehicle speed mode in the B position. In this way, the advantages of pedal control of vehicle speed are realized in the intermediate gear ratios as well as in the final drive. (Whenever the auto is operated in the engine speed mode, the engine speed is automatically adjusted by divider 12 so that the engine speed takes on the proper value for smooth engagement of the desired gear ratio.)

A control system for a vehicle has been described which gives improved fuel efficiency and operation. While specific arrangements have been described for implementing the concepts of this invention, it is understood that alternate and additional structures can be employed, including the use of digital sensors and circuitry including a microprocessor to implement the above described system. All such changes are deemed to be encompassed within the spirit and scope of this invention as characterized by the claims appended hereto.

I claim:
1. In a motor vehicle of the type employing an internal combustion engine coupled to a transmission system with one or more states for driving the wheels of said vehicle to achieve a speed according to the displacement of an accelerator pedal, said pedal controlling the engine via a throttle, said vehicle including a braking system for slowing the vehicle, the combination therewith of an automotive system for improving fuel efficiency, comprising:

engine speed sensor means for providing an output indicative of engine speed;

vehicle speed sensor means for providing an output indicative of vehicle speed;

means coupled to said accelerator pedal for providing an output control signal indicative of the magnitude of pedal actuation;

comparison means operative in a first mode to compare said control signal with said engine speed and operative in a second mode to compare said control signal with said vehicle speed for providing a comparison output signal indicative of any difference between said engine or vehicle speed as compared to said output control signal indicative of pedal actuation;

control means coupled to said engine and responsive to said comparison output signal to control the speed of said engine in said first mode, and to control the speed of said vehicle in a second mode, and mode selector logic coupled to said engine speed sensor means, said vehicle speed sensor means and said transmission system for automatically operating said comparison means in either said first or second modes to thereby automatically provide either engine speed or vehicle speed control.

* * * * *